US009884258B2

(12) United States Patent
Huang et al.

(10) Patent No.: US 9,884,258 B2
(45) Date of Patent: Feb. 6, 2018

(54) AUTOMATIC SHARING OF ENGAGING GAMEPLAY MOMENTS FROM MOBILE

(71) Applicant: Google Inc., Mountain View, CA (US)

(72) Inventors: Jonathan Huang, Mountain View, CA (US); Jennifer Anne Lees, Mountain View, CA (US)

(73) Assignee: Google LLC, Mountain View, CA (US)

(*) Notice: Subject to any disclaimer, the term of this patent is extended or adjusted under 35 U.S.C. 154(b) by 882 days.

(21) Appl. No.: 14/048,385

(22) Filed: Oct. 8, 2013

(65) Prior Publication Data

US 2015/0099586 A1 Apr. 9, 2015

(51) Int. Cl.
*A63F 13/86* (2014.01)
*A63F 13/87* (2014.01)
*A63F 13/332* (2014.01)
*A63F 13/212* (2014.01)

(52) U.S. Cl.
CPC ............ *A63F 13/87* (2014.09); *A63F 13/212* (2014.09); *A63F 13/332* (2014.09); *A63F 13/86* (2014.09)

(58) Field of Classification Search
CPC ....... A63F 13/87; A63F 13/212; A63F 13/332
USPC .......................................................... 463/40
See application file for complete search history.

(56) References Cited

U.S. PATENT DOCUMENTS

| 6,450,820 | B1* | 9/2002 | Palsson | G09B 19/22 434/236 |
| 8,187,104 | B2 | 5/2012 | Pearce | |
| 2004/0229685 | A1* | 11/2004 | Smith | A63F 13/10 463/29 |
| 2006/0205394 | A1* | 9/2006 | Vesterinen | H04M 1/72572 455/418 |
| 2008/0139301 | A1* | 6/2008 | Holthe | A63F 13/00 463/25 |
| 2008/0305832 | A1* | 12/2008 | Greenberg | H04W 8/18 455/557 |
| 2008/0317349 | A1* | 12/2008 | Ishikawa | G06K 9/00221 382/190 |

(Continued)

FOREIGN PATENT DOCUMENTS

| JP | 2004046620 A | 2/2004 |
| JP | 2007036830 A | 2/2007 |

(Continued)

OTHER PUBLICATIONS

ISR and Written Opinion for PCT/US2014/059677 dated Jan. 14, 2015.

(Continued)

*Primary Examiner* — Shauna-Kay Hall
(74) *Attorney, Agent, or Firm* — Morris & Kamlay LLP

(57) ABSTRACT

In a communication device comprising an operating system platform, which is operable to provide wired and/or wireless communication, and gaming, automatically detecting by the operating system platform, occurrence of one or more engaging gameplay moments for a corresponding game. For one or more users, the operating system platform may be operable to monitor one or more variables for the game to detect the occurrence of the one or more engaging gameplay moments. The operating system platform may be operable to detect whether to share information related to the one or more engaging gameplay moments with one or more social networking destinations.

30 Claims, 4 Drawing Sheets

(56) References Cited

U.S. PATENT DOCUMENTS

| | | | |
|---|---|---|---|
| 2009/0131177 A1* | 5/2009 | Pearce | 463/43 |
| 2009/0197681 A1* | 8/2009 | Krishnamoorthy | A63F 13/12 |
| | | | 463/42 |
| 2010/0144444 A1* | 6/2010 | Graham | A63F 13/10 |
| | | | 463/42 |
| 2010/0217802 A1 | 8/2010 | Rubio Andres et al. | |
| 2011/0230246 A1* | 9/2011 | Brook | A63F 3/0421 |
| | | | 463/9 |
| 2011/0312424 A1* | 12/2011 | Burckart | H04N 21/4788 |
| | | | 463/42 |
| 2012/0021829 A1 | 1/2012 | Shoham et al. | |
| 2012/0311032 A1 | 12/2012 | Murphy et al. | |
| 2013/0143669 A1* | 6/2013 | Muller | A63F 13/12 |
| | | | 463/42 |
| 2013/0260896 A1 | 10/2013 | Miura et al. | |
| 2013/0324257 A1* | 12/2013 | Mizuki | G06F 17/30283 |
| | | | 463/42 |
| 2014/0155171 A1* | 6/2014 | Laakkonen | G07F 17/3272 |
| | | | 463/42 |
| 2014/0179439 A1* | 6/2014 | Miura et al. | 463/42 |
| 2014/0228112 A1* | 8/2014 | Laakkonen | A63F 13/10 |
| | | | 463/31 |

FOREIGN PATENT DOCUMENTS

| | | |
|---|---|---|
| KR | 1020060100696 A | 9/2006 |
| WO | 2009094611 A2 | 7/2009 |
| WO | WO-2009094611 A2 | 7/2009 |
| WO | 2011031761 | 3/2011 |

OTHER PUBLICATIONS

Extended European Search Report dated Jun. 12, 2017 as received in Application No. 14851951.5.

\* cited by examiner

AUTOMATIC SHARING OF ENGAGING GAMEPLAY MOMENTS FROM MOBILE

CROSS-REFERENCE TO RELATED APPLICATIONS/INCORPORATION BY REFERENCE

Not Applicable.

FIELD

Certain embodiments of the disclosure relate to gaming. More specifically, certain embodiments of the disclosure relate to a method and system for automatic sharing of engaging gameplay moments from a mobile device.

BACKGROUND

In conventional systems, mobile gaming takes place in an anti-social manner. In this regard, while players experience joyful moments while playing games on their smartphones, they are unable to share and therefore fully receive emotional reward for these in-game moments and their corresponding achievements. While a game developer can implement a game-specific approach to capturing and sharing these moments, there is no system level feature that automatically enables sharing of engaging and interesting gameplay activity across all games that a user plays on a platform. Conversely, there is no feature that readily allows consumption or usage of these gameplay moments.

Some games may, through the use of a third party application, enable interesting moments to be shared across games, among multiple parties. However, each of the parties must have the third party application installed in order to share the information.

Some games may prompt a user to post text related information to a Facebook account or profile when certain achievements have been met. However, the posted information cannot be further consumed.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for automatic sharing of engaging gameplay moments from a mobile device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Certain embodiments of the disclosure may be found in a method and system for automatic sharing of engaging gameplay moments from a mobile device. In various embodiments of the disclosure, a communication device that enables wired and/or wireless communication and gaming is provided. The communication device includes an operating system platform that automatically detects the occurrence of one or more gameplay moments for a corresponding game. For one or more users, the operating system platform may be operable to monitor the game to detect of the occurrence of the one or more gameplay moments. In this regard, the operating system platform may be operable to detect whether a gameplay event corresponding to the one or more gameplay moments is engaging. The operating system platform may be operable to determine whether to share information related to the one or more gameplay moments with one or more social networking destinations.

The monitoring may include, for example, monitoring one or more of frequency of corresponding user interactions, achievements unlocked, high scores, multiplayer matches, voice interaction, and biometric and/or physiological information for the one or more users. The corresponding user interactions include frequency of touching a touchscreen display, frequency of touching one or more controlling keys for said game, and a corresponding pressure associated with said user interaction. The biometric and/or physiological information for the one or more users may include fingerprint data, retina scan data, facial expression, blood pressure data, pulse data, and perspiration data.

The operating system platform 204 may be operable to compare data associated with the one or more gameplay moments against baseline data to determine whether one or more corresponding thresholds have been satisfied. Video corresponding to a specified time period associated with occurrence of a gameplay event corresponding to the one or more gameplay moments may be captured and stored. It may be determined whether to share the information with the one or more social networking destinations based on whether one or more corresponding players of the game allows sharing of the information. In this regard, information related to the one or more gameplay moments may be posted to the one or more social networking destinations for the one or more corresponding players, if the one or more corresponding players has given permission to share the information.

Figure 1:
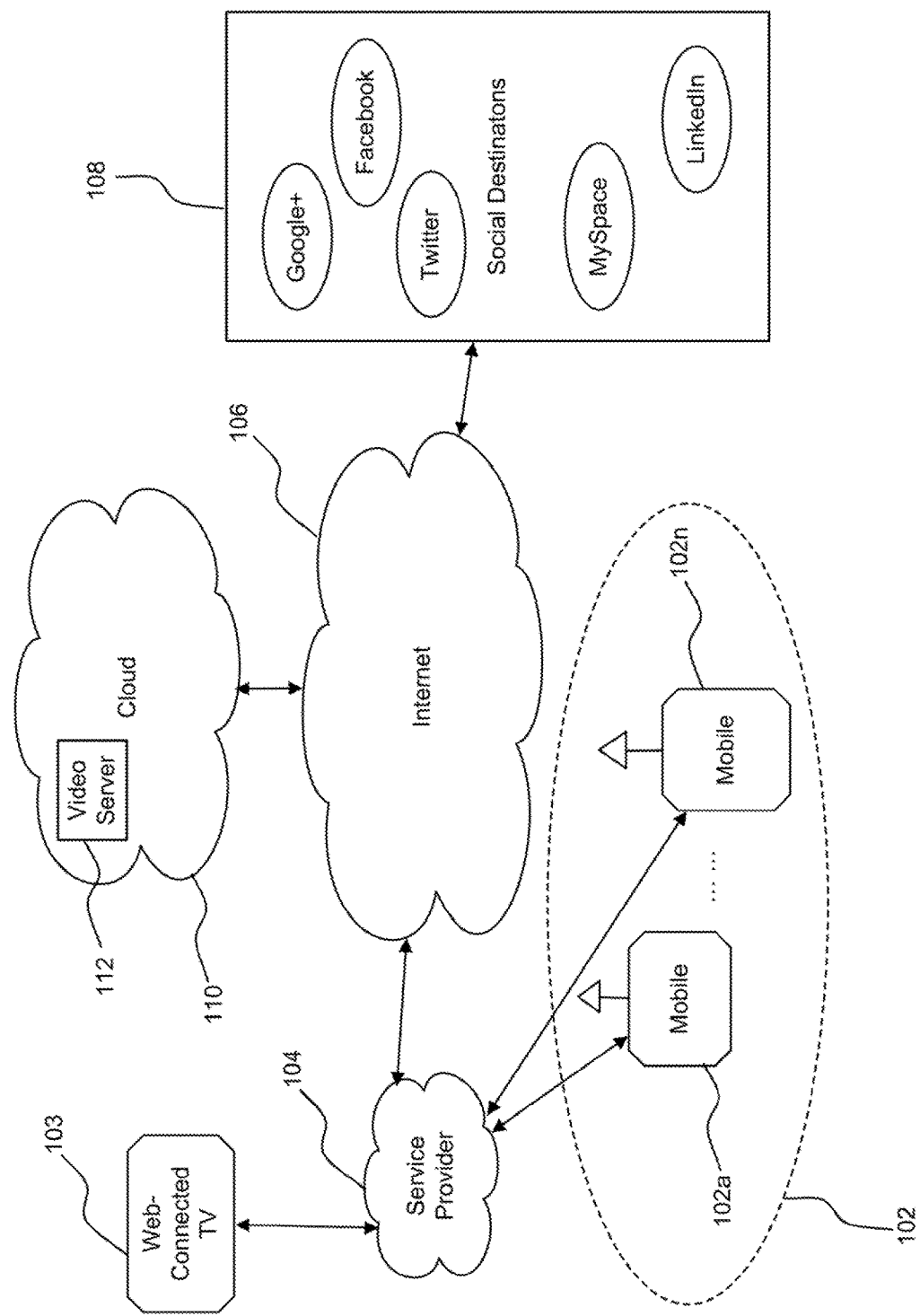
FIG. 1 is a block diagram of an example system for providing automatic sharing of engaging gameplay moments from a mobile device, in accordance with an embodiment of the disclosure.

FIG. 1 is a block diagram of an example system for providing automatic sharing of engaging gameplay moments from a mobile device, in accordance with an embodiment of the disclosure. Referring to FIG. 1, there is shown a plurality of mobile devices 102a . . . 102n, a web-connected television 103, a service provider 104, the Internet 106, a plurality of social destinations 108, a cloud 110 and a video server 112. The plurality of mobile devices 102a . . . 102n may be collectively referenced as mobile devices 102.

Each of the mobile devices 102 may include suitable logic, circuitry, interfaces and/or code that may be operable to provide communication and to engage in the playing of games. The mobile devices 102 may receive communication services from the service provider 104. Each of the mobile devices 102 may include an operating system platform that includes integrated capability to automatically share engaging gameplay moments. In this regard, the operating system platform is operable to monitor and detect when engaging gameplay moments occur. In instances when it is determined that engaging gameplay moments have occurred, the operating system platform may determine whether or not to share the engaging gameplay moments with one or more of the social destinations 108. The mobile devices 102 may include Smartphones, tablets, and other similar type of handheld communication devices. In accordance with various embodiments of the disclosure, the capability of the mobile devices 102 to monitor, detect and share gameplay moments is a platform level feature that is built into the operating system platform and is not an application that runs on the operating system.

The web-connected television 103 may include suitable logic, circuitry, interfaces and/or code that may be operable to receive traditional television services as well as communicate via the Internet 106 and engage in the playing of single player and multiplayer games. In accordance with various embodiments of the disclosure, the web-connected television 103 may include an operating system platform that includes integrated capability to automatically share engaging gameplay moments. In this regard, similar to the mobile devices 102, the operating system platform is enabled to monitor and detect the occurrence of engaging gameplay moments. Whenever such engaging gameplay moments occur, the operating system platform may determine whether or not the engaging gameplay moments should be shared with one or more of the social destinations 108. In accordance with various embodiments of the disclosure, capability of the web-connected television 103 to monitor, detect and share gameplay moments is a platform level feature that is built into the operating system platform and is not an application that runs on the operating system.

The service provider 104 may include suitable device and interfaces that may be operable to provide Internet based services to various communication devices. In this regard, the service provider 104 may provide services to the various communication devices using a wired and/or a wireless communication medium. For example, the service provider 104 may provide Internet services to each of the mobile devices 102 and the web-connected television 103. The service provider 104 may include a cellular, satellite, cable or DSL service provider.

The Internet 106 may include suitable devices and interfaces that enable interconnectivity and communication amongst a network of computers, communication devices and servers. The service provider 104 may be operable to provide service to the Internet 106 for each of the mobile devices 102, and the web-connected television 103. The Internet 106 and the Cloud 110 may host one or more application servers and/or game servers that may enable users of the mobile devices 102 and the web-connected television to play single player as well as multiplayer games.

Each of the plurality of social destinations 108 may include Internet based services that enable a plurality of users to interact personally with each other. In this regard, each of the plurality of social destination may enable the sharing and exchange of personal information, which may include voice, video, data, and text. In accordance with various embodiments of the disclosure, one or more of the plurality of social destinations may possess the capability to share one or more postings of engaging gameplay moments.

The Cloud 110 may host one or more game servers that may enable users of the mobile devices 102 and the web-connected television to play single player as well as multi-player games. The cloud 110 may host the video server 112. The Cloud 110 may be accessible to the mobile devices 102 and the web-connected television 103 via the Internet 106.

The video server 112 may include suitable logic, circuitry, interfaces and/or code that may be operable to serve and/or store video game related information. For example, the video server 112 may be operable to store video corresponding to engaging gameplay moments. The video server 112 may be located in the Cloud 110.

In operation, the operating system platform within the mobile devices 102 and the web-connected television 103 are operable to automatically monitor and detect when engaging gameplay moments occur. The operating system platform within the mobile devices 102 and the web-connected television 103 are operable to capture video related to the engaging gameplay moments and store the captured video in the video server 112 within the Cloud 110. In instances when an engaging gameplay moment is detected, the operating system platform may determine whether the detected engaging gameplay moments should be shared with one or more of the social destinations 108. In instances where it is determined that the detected gameplay moments should be shared with one or more of the social destinations 108, the captured video and other corresponding metadata information may be communicated to the social destination. In this regard, other players or users of the social destinations may consume and interact with the stored gameplay moment.

Figure 2:
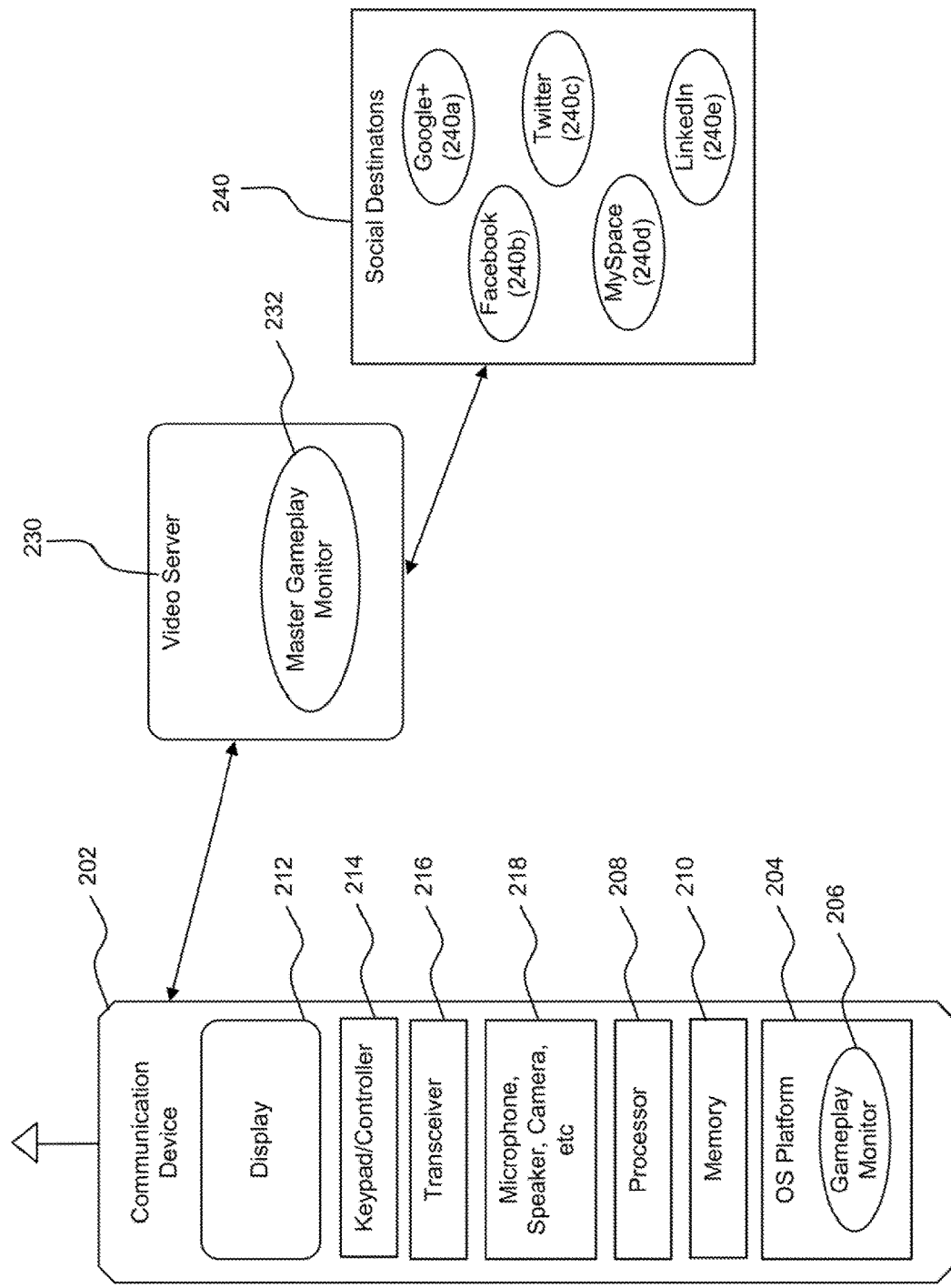
FIG. 2 is a block diagram illustrating automatic sharing of engaging gameplay moments from an operating system platform within a device, in accordance with an embodiment of the disclosure.

FIG. 2 is a block diagram illustrating automatic sharing of engaging gameplay moments from an operating system platform within a device, in accordance with an embodiment of the disclosure. Referring to FIG. 2, there is shown a communication device 202, a video server 230 and a plurality of social destinations 240. The communication device 202 include and operating system (OS) platform 204, a processor 208, memory 210, display 212 and keypad controller 214. The OS platform 204 includes a gameplay monitor 206. The communication device 202 may also include a microphone, speaker and a camera, which are collectively referenced as devices 218.

The communication device 202 may include suitable logic circuitry, interfaces and/or code that may be operable to communicate utilizing one or more wired and/or wireless technologies. In an example embodiment of the disclosure, the communication device 202 may communicate wirelessly utilizing 802.11 a/b/g/n/e, 802.16, 3G, 4G, and Bluetooth. In another example embodiment of the disclosure, the communication device 202 may communicate using wired technology such as Ethernet. The communication device 202 may include a Smartphone, a tablet, or a web-connected TV. Notwithstanding, the communication device 202 may include an OS platform 204 that possesses the capability to automatically detect gameplay moments and share these detected moments whenever it is permissible to do so.

The OS platform 204 may include suitable logic, interfaces and/or code that may be operable to control operation of the communication device. For example, the OS platform 204 may enable a user to interact with communication device 202 and to run or execute applications.

The gameplay monitor 206 is built in as part of the OS platform 204 and may include suitable logic, interfaces and/or code that may be operable to automatically monitor and detect gameplay moments. The gameplay monitor 206 is not an application that runs on the operating system platform 204, but instead, is integrated as part of the operating system platform 204. In an example embodiment of the disclosure, the gameplay monitor 206 may monitor information or variables such as the frequency of touches and pressure on keypad or other game control device, achievements unlocked, high scores, multiplayer matches, and voice chat information. The gameplay monitor 206 may also be operable to monitor biometric and/or physiological characteristics of a player, for example facial expression of the player pulse rate, sweating in the face or palms, and other similar types of information. During the monitoring, the gameplay monitor may be operable to continuously store video of gameplay, and discard the video after a specified period of time, for example, 10 seconds. In instances when the gameplay monitor 206 detects a gameplay moment, a 12-second video clip, for example, may be captured. The example 12-second video clip may include 10 seconds leading up to the corresponding trigger event for the gameplay moment, as well as an additional 2 seconds post-trigger-event video. It should be noted that the lengths of the video captured may vary without limiting the scope of the disclosure. Accordingly, the pre-engagement/trigger time may be greater than or less than 10 seconds and the post-engagement/trigger time may be greater than or less than 2 seconds.

In accordance with various embodiments of the disclosure, the gameplay monitor 206 may be operable to utilize, for example, a Bayesian algorithm, seeded by test data set across the example variables, and adaptive over time, to monitor gameplay moments. The engagement of specific gameplay moments may be detected by checking these monitored variables against a threshold. In an example embodiment of the disclosure, the unlocking of an achievement may be utilized as a baseline measure for triggering the occurrence of a gameplay moment. In this regard, the gameplay monitor 206 may be operable to encode the resulting captured video and communicate the encoded captured video to the video server 230.

The processor 208 may include suitable logic, circuitry, interfaces, and/or code that may be operable to execute code or otherwise control operation of the communication device 202. For example, the processor 208 may be operable to control the OS platform 204, the gameplay monitor 206, the memory 210, the display 212, and the keypad/controller 214. In accordance with various embodiments of the disclosure, the processor 208 may be operable to handle operations of the gameplay monitor 206, which may be utilized to detect gameplay moments.

The memory 210 may include suitable logic, circuitry, interfaces, and/or code that may be operable to store operating and temporary data for the communication device 202. For example, the memory may be enabled to store configuration and operating data for the communication device 202. The memory 210 may be operable to store OS platform information and data as well as data utilized by the gameplay monitor 206 for detecting gameplay moments. The memory 210 may be operable to store captured gameplay video for the gameplay monitor 206. Additionally, the memory 210 may store corresponding encoded captured video prior to it being communicated to the video server 230.

The display 212 may include suitable logic, circuitry, interfaces, and/or code that may be operable to display a user interface that enables a user to interact with the communication device 202. For example, the display 212 may be utilized to configure the communication device 202 as well as provide user interaction when playing a game. In this regard, the display 212 may provide visual and/or touch interaction for the communication device 202. The display 212 may include LED, LCD or variants thereof.

The keypad controller 214 may include suitable logic, circuitry, interfaces, and/or code that may be operable to control and manipulate the communication device 202. In this regard, the keypad controller 214 may be utilized to control applications such as games, which may be running on the communication device 202. The keypad controller 214 may include a physical set of keys or buttons, and/or a software generated set of keys.

The transceiver 216 may include suitable logic, circuitry, interfaces, and/or code that may be operable to handle wired and/or wireless communication for the communication device 202. For example, the transceiver 216 may be operable to handle wireless technologies such as 802.11 a/b/g/n/e, 802.16, 3G, 4G, Bluetooth and wired technologies such as Ethernet.

The communication device 202 may also include a microphone, speaker and a camera, which are collectively referenced as devices 218. The microphone and camera 218 may be operable to capture video and/or corresponding audio that may be associated with a gameplay that is monitored and/or detected by the gameplay monitor 206. The speaker may be utilized to play audio. In instances where the communication device 202 is a Smartphone, the microphone, speaker and/or camera 218 may be integrated as part of the smartphone. In instances where the communication device 202 is a web-connected television 103, one or more of the microphone, the speaker and the camera 218 may be a peripheral device that may be coupled to the web-connected television 103. For example, the microphone and speaker may be integrated in the web-connected television 103 and the camera may be an externally coupled device.

The video server 230 may include suitable logic circuitry, interfaces and/or code that may be operable to run a master gameplay monitor 232 that corresponds to the gameplay monitor 206, which is part of the OS platform 204. Since the video server 230 may include more processing resources than the communication device 202, the master gameplay monitor 232, which runs on the video server 230, may include a more sophisticated and advanced algorithm than the gameplay monitor 206. In this regard, the master gameplay monitor 232 running on the video server 230 may be operable to utilize, for example, a more advanced Bayesian algorithm, seeded by test data set across at least the example variables, and adaptive over time, to monitor and detect gameplay moments.

The gameplay monitor 206 may be operable to communicate or pass information to the master gameplay monitor 232 running on the video server 230. The master gameplay monitor 232 running on the video server 230 may be operable to utilize the received information and generate updated information or data, which may be communicated to the gameplay monitor 206, which is part of the OS platform 204. The gameplay monitor 206 may utilize the updated information or data to monitor and detect gameplay moments. Once the gameplay monitor 206 detects a triggered gameplay moment, an automatically generated caption of the game title and time the event was generated or triggered as well as any corresponding available metadata, such as achievement name may be embedded in the corresponding video. The gameplay monitor 206 may be operable to store the resulting video and the embedded information, as well as any other information related to the player and the game, in the video server 230. Game and player recommendations may consume and utilize this stored information as recommendation for other users and game enthusiasts. The game and player recommendations may be handled by the video server 230. Additionally, in instances when a particular event is triggered by a new player who is connected to the originating player, the new player is notified that the originating player also triggered the same event and had a similar experience. In this regard, the corresponding notification may include an audio and/or visual alert.

The social destinations 240 may include a plurality of example social websites such as Google+ 240*a*, Facebook 240*b*, Twitter 240*c*, MySpace 240*d* and LinkedIn 240*e*. One or more of the social destinations 240 may be utilized to share posts of the detected gameplay moments. There may be a provision which may allow a player to block or otherwise prevent information from being shared with one or more of the social destinations 240. Accordingly, various embodiments of the disclosure may determine whether or not the post should be shared with one or more of the social destinations 240 prior to posting. The posts may appear in a delineated section of one or more of the social destinations 240 so that any user of the social destination can consume game activity. In some embodiments of the disclosure, restrictions may be placed on which users or the types of users that may be allowed to view and/or otherwise consume the post.

In accordance with an alternate embodiment of the disclosure, a plurality of pre-coded events may be utilized to establish the occurrence of achievements. Once the gameplay monitor 206 detects the occurrence of one or more of the plurality of pre-coded events, then corresponding video and metadata may be captured, encoded and stored to the video server 230. Permissible postings may them be made to one or more of the social destinations 240.

In operation the gameplay monitor 206 may be operable to monitor a plurality of gameplay variables in order to detect whether a gameplay moment has engaged. The monitoring may occur on a continuous basis and is an adaptive process. In this regard, the gameplay monitor 206 may be operable to periodically or aperiodically send gameplay information to the master gameplay monitor 232. The master gameplay monitor 232 may be operable to communicate updated information to the gameplay monitor 206, the latter of which may utilized the updated information to monitor for engaging gameplay moments. The monitored variables may be compared to corresponding threshold variables in order to determine whether a gameplay moment has engaged. In instances where a gameplay moment has been engaged, then the corresponding video and associated metadata information may be posted to a social media destination whenever it is permissible to do so.

Figure 3:
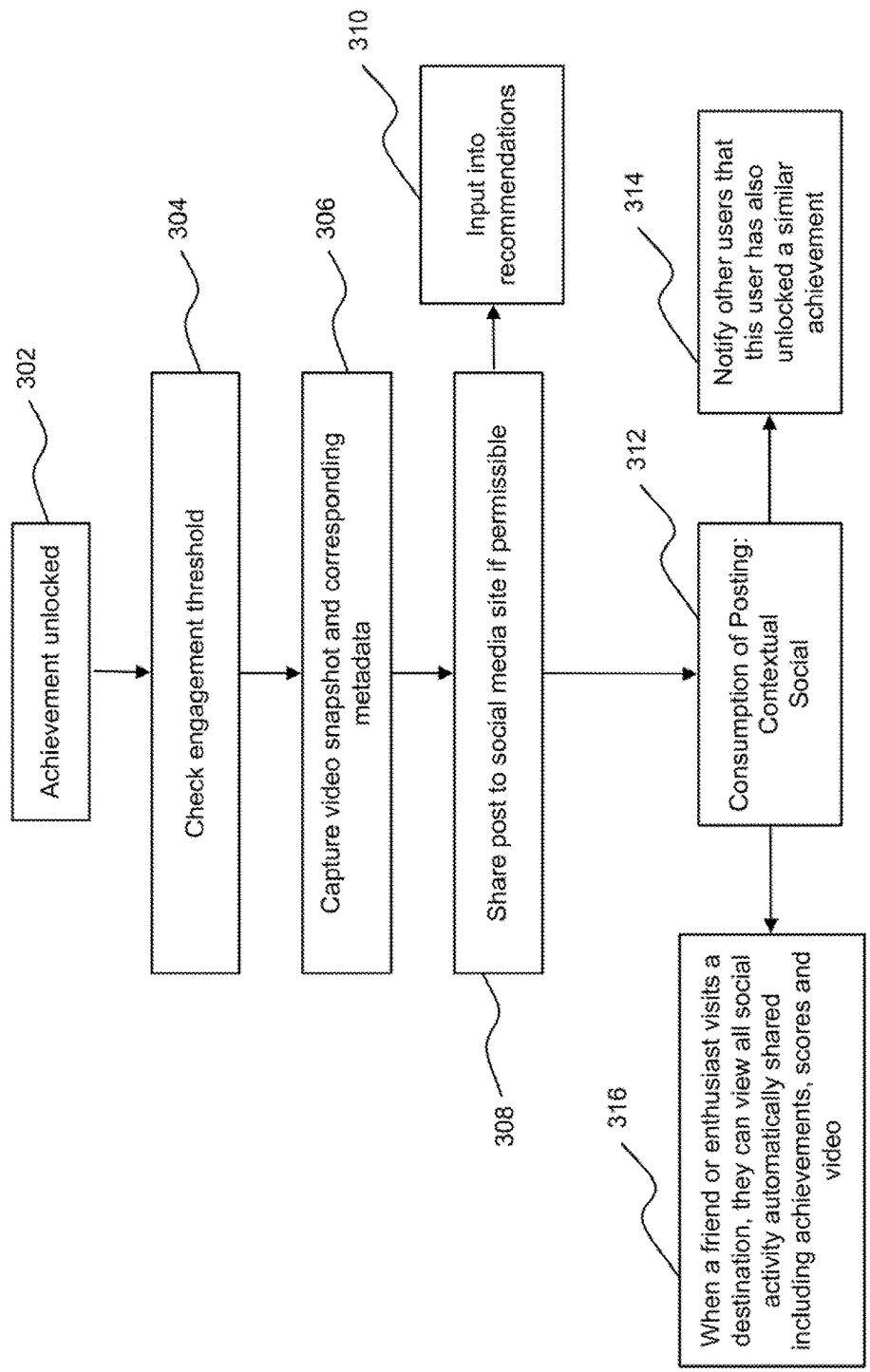
FIG. 3 is a flow chart illustrating example steps for automatic sharing of engaging gameplay moments from an operating system platform within a device, in accordance with an embodiment of the disclosure.

FIG. 3 is a flow chart illustrating example steps for automatic sharing of engaging gameplay moments from an operating system platform within a device, in accordance with an embodiment of the disclosure. Referring to FIG. 3, there is shown an example step 302 in which an achievement is unlocked. In step 304, an engagement threshold may be checked. In step 306, assuming the engagement threshold has been met and an engaging gameplay moment has been detected, a video snapshot and corresponding metadata may be captured. In step 308, the captured video and corresponding information associated with the metadata may be shared with a social media site if it is permissible to do so. In step 310, the post and/or metadata may be utilized as input to recommendations, which may be handled by the video server 230.

In step 312, consumption of the posting may occur. This may include contextual and well as social consumption. In step 314, other users may be notified that this user has also unlocked a similar achievement. In step 316, when a friend or enthusiast visits a destination, they can view all social activity that is automatically shared including achievements, scores and the corresponding video.

Figure 4:
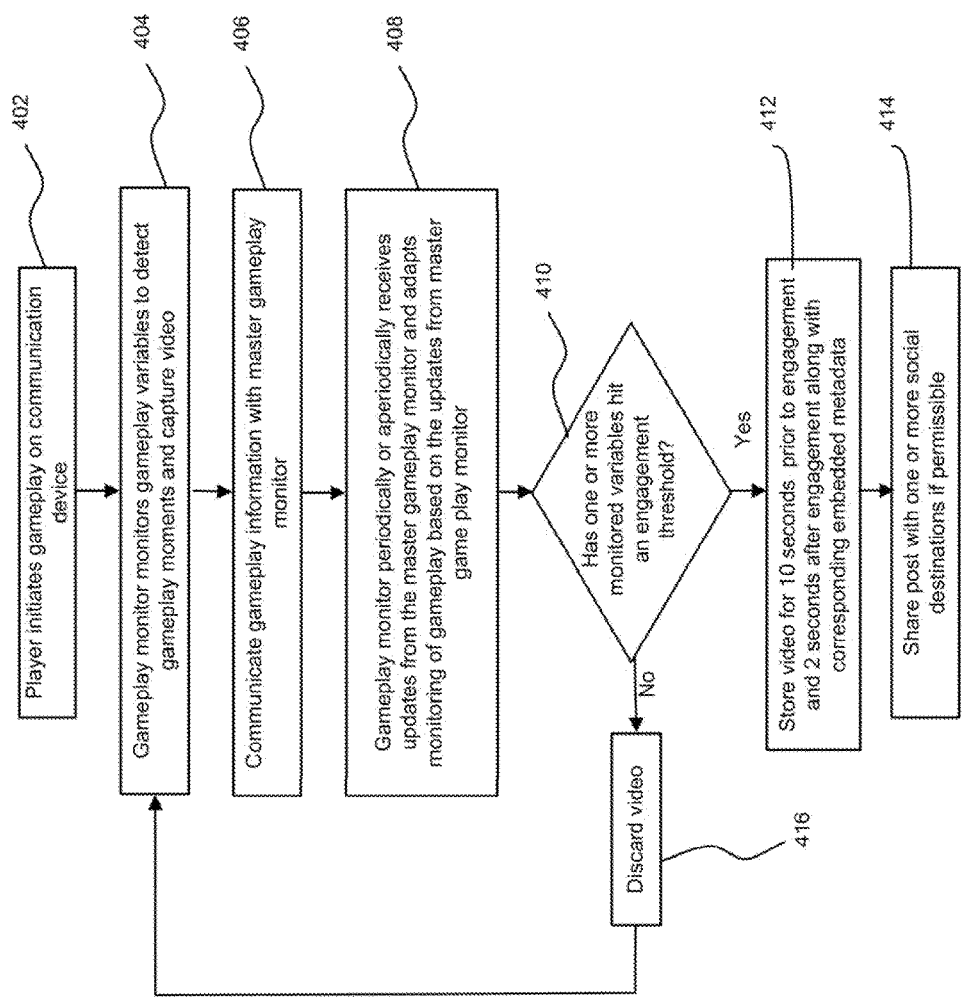
FIG. 4 is a flow chart illustrating example steps for monitoring and detecting engaging gameplay moments from an operating system platform within a device, in accordance with an embodiment of the disclosure.

FIG. 4 is a flow chart illustrating example steps for monitoring and detecting engaging gameplay moments from an operating system platform within a device, in accordance with an embodiment of the disclosure. Referring to FIG. 4, in step 402, a player may initiate gameplay on a communication device 202. In step 404, the gameplay monitor 206 monitors gameplay variables to detect gameplay moments and capture video. In step 406, the gameplay monitor 206 may communicate gameplay information with the master gameplay monitor 232. In step 408, the gameplay monitor 206 periodically or aperiodically receives updates from the master gameplay monitor 232 and adapts monitoring of gameplay based on the updates from the master gameplay monitor 232.

In step 410, it may be determined whether one or more of the monitored gameplay variables has hit an engagement threshold. If one or more of the monitored gameplay variables has hit an engagement threshold, then in step 412, video for 10 seconds prior to engagement and 2 seconds after engagement may be stored along with corresponding embedded metadata information. In step 414, a post may be shared with one or more social destinations if permissible.

Returning to step 410, if one or more of the monitored gameplay variables has not hit an engagement threshold, then in step 416, the captured video from step 404 may be discarded. Control then passes to step 404, where the gameplay monitor 206 continues to monitor gameplay variables to detect gameplay moments and capture video.

In various embodiments of the disclosure, in a communication device 202 including an operating system platform 204, which is operable to provide wired and/or wireless communication, and gaming, automatically detecting by the operating system platform 204, occurrence of one or more gameplay moments for a corresponding game. For one or more users, the operating system platform 204 may be operable to monitor the game to detect of the occurrence of the one or more gameplay moments. In this regard, the operating system platform 204 may be operable to detect whether a gameplay event corresponding to the one or more gameplay moments is engaging. The operating system platform 204 may be operable to determine whether to share information related to the one or more gameplay moments with one or more social networking destinations.

The monitoring may include, monitoring one or more of frequency of corresponding user interactions, achievements unlocked, high scores, multiplayer matches, voice interaction, and biometric and/or physiological information for the one or more users. The corresponding user interactions include frequency of touching a touchscreen display, frequency of touching one or more controlling keys for said game, and a corresponding pressure associated with said user interaction. The biometric and/or physiological information for the one or more users may include fingerprint data, retina scan data, facial expression, blood pressure data, pulse data, and perspiration data.

The operating system platform 204 may be operable to compare data associated with the one or more gameplay moments against baseline data to determine whether one or more corresponding thresholds have been satisfied. Video corresponding to a specified time period associated with occurrence of a gameplay event corresponding to the one or more gameplay moments may be captured and stored. It may be determined whether to share the information with the one or more social networking destinations based on whether one or more corresponding players of the game allows sharing of the information. In this regard, information related to the one or more gameplay moments may be posted to the one or more social networking destinations for the one or more corresponding players, if the one or more corresponding players has given permission to share the information.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatic sharing of engaging gameplay moments from a mobile device.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in an electronic device comprising an operating system platform operable to provide gaming and at least one of wired communication or wireless communication:
performing, by a first gameplay monitor of the operating system platform, a monitoring of a gameplay of a game to detect an occurrence of one or more gameplay moments;
communicating, to a second gameplay monitor via a network, a gameplay information, the second gameplay monitor being a master gameplay monitor in a server;
receiving, by the first gameplay monitor from the second gameplay monitor via the network, an update, the update based on the gameplay information;
adjusting, by the first gameplay monitor and based on the update, the monitoring of the gameplay; and
determining, by the operating system platform, whether to share information related to the one or more gameplay moments with one or more social networking destinations.

2. The method according to claim 1, wherein the first gameplay monitor is a part of one or more of a smartphone, a tablet, or a web-connected TV.

3. The method according to claim 2, wherein the monitoring comprises monitoring one or more of:
frequency of corresponding user interactions,
achievements unlocked,
high scores,
multiplayer matches,
voice interaction, or
one or more of biometric information or physiological information.

4. The method according to claim 3, wherein the corresponding user interactions comprise at least one of:
frequency of touching a touchscreen display,
frequency of touching one or more controlling keys for the game, or
a corresponding pressure associated with a user interaction of the corresponding user interactions.

5. The method according to claim 3, wherein the one or more of the biometric information or the physiological information comprise at least one of:
fingerprint data,
retina scan data,
facial expression,
blood pressure data,
pulse data, or
perspiration data.

6. The method according to claim 1, wherein the occurrence of the one or more gameplay moments includes an occurrence of engagement.

7. The method according to claim 1, further comprising comparing data associated with the one or more gameplay moments against baseline data to determine whether one or more corresponding thresholds have been satisfied.

8. The method according to claim 1, further comprising capturing video corresponding to a specified time period associated with an occurrence of a gameplay event corresponding to the one or more gameplay moments.

9. The method according to claim 1, wherein the determining is based on whether one or more corresponding players of the game allow the information related to the one or more gameplay moments to be shared.

10. The method according to claim 9, further comprising enabling a posting of the information related to the one or more gameplay moments if the one or more corresponding players allow the information related to the one or more gameplay moments to be shared.

11. A system, comprising:
a processor configured to:
perform, by a first gameplay monitor of an operating system platform, a monitoring of a gameplay of a game to detect an occurrence of one or more gameplay moments;
communicate, to a second gameplay monitor via a network, a gameplay information, the second gameplay monitor being a master gameplay monitor in a server;
receive, by the first gameplay monitor from the second gameplay monitor via the network, an update, the update based on the gameplay information;
adjust, by the first gameplay monitor and based on the update, the monitoring of the gameplay; and
determine, by the operating system platform, whether to share information related to the one or more gameplay moments with one or more social networking destinations.

12. The system according to claim 11, wherein the first gameplay monitor is a part of one or more of a smartphone, a tablet, or a web-connected TV.

13. The system according to claim 12, wherein the processor is operable to monitor one or more of:
frequency of corresponding user interactions,
achievements unlocked,
high scores,
multiplayer matches,
voice interaction, or
one or more of biometric information or physiological information.

14. The system according to claim 13, wherein the corresponding user interactions comprise at least one of:
frequency of touching a touchscreen display,
frequency of touching one or more controlling keys for the game, or
a corresponding pressure associated with a user interaction of the corresponding user interactions.

15. The system according to claim 13, wherein the one or more of the biometric information or the physiological information comprise at least one of:
fingerprint data,
retina scan data,
facial expression,
blood pressure data,
pulse data, or
perspiration data.

16. The system according to claim 11, wherein the occurrence of the one or more gameplay moments includes an occurrence of engagement.

17. The system according to claim 11, wherein the processor is further operable to compare data associated with the one or more gameplay moments against baseline data to determine whether one or more corresponding thresholds have been satisfied.

18. The system according to claim 11, wherein the processor is further operable to capture video corresponding to a specified time period associated with an occurrence of a gameplay event corresponding to the one or more gameplay moments.

19. The system according to claim 11, wherein the processor is configured to determine based on whether one or more corresponding players of the game allow the information related to the one or more gameplay moments to be shared.

20. The system according to claim 19, wherein the processor is further configured to enable a posting of the information related to the one or more gameplay moments if the one or more corresponding players allow the information related to the one or more gameplay moments to be shared.

21. A non-transitory computer-readable medium, comprising:
processor-executable instructions stored thereon configured to cause a processor to:
perform, by a first gameplay monitor of an operating system platform, a monitoring of a gameplay of a game to detect an occurrence of one or more gameplay moments;
communicate, to a second gameplay monitor via a network, a gameplay information, the second gameplay monitor being a master gameplay monitor in a server;
receive, by the first gameplay monitor from the second gameplay monitor via the network, an update, the update based on the gameplay information;
adjust, by the first gameplay monitor and based on the update, the monitoring of the gameplay; and
determine, by the operating system platform, whether to share information related to the one or more gameplay moments with one or more social networking destinations.

22. The non-transitory computer-readable medium according to claim 21, wherein the first gameplay monitor is a part of one or more of a smartphone, a tablet, or a web-connected TV.

23. The non-transitory computer-readable medium according to claim 22, wherein the monitoring comprises monitoring one or more of:
frequency of corresponding user interactions,
achievements unlocked,
high scores,
multiplayer matches,
voice interaction, or
one or more of biometric information or physiological information.

24. The non-transitory computer-readable medium according to claim 23, wherein the corresponding user interactions comprise at least one of:
frequency of touching a touchscreen display,
frequency of touching one or more controlling keys for the game, or
a corresponding pressure associated with a user interaction of the corresponding user interactions.

25. The non-transitory computer-readable medium according to claim 23, wherein the one or more of the biometric information or the physiological information comprise at least one of:
fingerprint data,
retina scan data,
facial expression,
blood pressure data,
pulse data, or
perspiration data.

26. The non-transitory computer-readable medium according to claim 21, wherein the occurrence of the one or more gameplay moments includes an occurrence of engagement.

27. The non-transitory computer-readable medium according to claim 21, wherein the processor-executable instructions further include instructions configured to cause the processor to compare data associated with the one or more gameplay moments against baseline data to determine whether one or more corresponding thresholds have been satisfied.

28. The non-transitory computer-readable medium according to claim 21, wherein the processor-executable instructions further include instructions configured to cause the processor to capture video corresponding to a specified time period associated with an occurrence of a gameplay event corresponding to the one or more gameplay moments.

29. The non-transitory computer-readable medium according to claim 21, wherein the processor-executable instructions are based on whether one or more corresponding players of the game allow the information related to the one or more gameplay moments to be shared.

30. The non-transitory computer-readable medium according to claim 29, wherein the processor-executable instructions further include instructions configured to cause the processor to enable a posting of the information related to the one or more gameplay moments if the one or more corresponding players allow the information related to the one or more gameplay moments to be shared.

* * * * *